United States Patent
Yoon et al.

(10) Patent No.: US 9,269,113 B2
(45) Date of Patent: Feb. 23, 2016

(54) ENERGY MANAGEMENT SYSTEM AND A SCREEN GENERATION METHOD THEREOF

(71) Applicant: LSIS CO., LTD., Anyang-si, Gyeonggi-do (KR)

(72) Inventors: Yeo Chang Yoon, Seoul (KR); Yong Hark Shin, Seoul (KR); Jong Ho Park, Gwangmyeong-si (KR); Myung Hwan Lee, Goyang-si (KR); Seung Ju Lee, Ansan-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 269 days.

(21) Appl. No.: 14/029,132

(22) Filed: Sep. 17, 2013

(65) Prior Publication Data
US 2014/0288888 A1     Sep. 25, 2014

(30) Foreign Application Priority Data
Mar. 20, 2013   (KR) .......................... 10-2013-0029761

(51) Int. Cl.
G06Q 50/06     (2012.01)
G06Q 10/10     (2012.01)

(52) U.S. Cl.
CPC ............... *G06Q 50/06* (2013.01); *G06Q 10/10* (2013.01)

(58) Field of Classification Search
None
See application file for complete search history.

(56) References Cited

U.S. PATENT DOCUMENTS

2008/0195576 A1*   8/2008   Sande et al. ...................... 707/2
2013/0091258 A1*   4/2013   Shaffer et al. ................. 709/221

OTHER PUBLICATIONS

Holmlund et al., "Information exchange with CIM for the Energy Industry," KTH Electrical Engineering, Stockholm, Sweeden 2011.*
Mentor Graphics, "Capital HarnessXC," http://www.mentor.com/products/electrical-design-software/capital/harness-xc, Jun. 11, 2011.*
McMorran, "An Introduction to IEC 61970-301 & 61968-11: The Common Information Model," University of Strathclyde, Jan. 2007, 42 pages.
Korean Intellectual Property Office Application Serial No. 10-2013-0029761, Office Action dated Jul. 1, 2014, 5 pages.
Korean Intellectual Property Office Application Serial No. 10-2013-0029761, Office Action dated Nov. 27, 2014, 4 pages.
Lim, "Service Oriented Architecture based Single Line Diagram Auto-drawing Technique in Distribution Automation Systems," Journal of the Korean Institute of Illuminating and Electrical Installation Engineers (2012) 26(7), Jul. 2012, pp. 23-29.
Son, et al., "A Single Line Diagram Auto-drawing Technic for Efficient Operating Distribution Network," Jul. 2009, 2 pages.

* cited by examiner

*Primary Examiner* — Kee M Tung
*Assistant Examiner* — Nicholas R Wilson
(74) *Attorney, Agent, or Firm* — Lee, Hong, Degerman, Kang & Waimey

(57) ABSTRACT

A screen generation method of an energy management system according to the present disclosure may include performing system visualization modeling indicating a connection relationship between monitoring facilities in a power system to generate a first screen; generating a file containing information on a connection relationship between facilities used during the first screen generation; and generating a second screen for monitoring facilities during the real-time operation using the generated file.

8 Claims, 3 Drawing Sheets

- SCREEN INFORMATION
- OBJECT INFORMATION
- CONNECTION RELATIONSHIP INFORMATION

| FACILITY | SYSTEM VISUALIZATION | GRAPHIC EDITOR | |
|---|---|---|---|
| | XML INFORMATION | KIND | SHAPE |
| CIRCUIT BREAKER | CB | SYMBOL | □ |
| DISCONNECTING SWITCH | DS | SYMBOL | ⧖ |
| TRANSFORMER | TR | SYMBOL | ⊛ |
| GENERATOR | GEN | SYMBOL | ⊙ |
| LINE | LN | LINE | ↑ |
| BUS BAR | BSB | LINE | — |

ENERGY MANAGEMENT SYSTEM AND A SCREEN GENERATION METHOD THEREOF

CROSS-REFERENCE TO RELATED APPLICATIONS

Pursuant to 35 U.S.C. §119(a), this application claims the benefit of earlier date and right of priority to Korean Patent Application No. 10-2013-0029761, filed on Mar. 20, 2013, the contents of which is incorporated by reference herein in its entirety.

BACKGROUND OF THE INVENTION

1. Field of the Invention

The present disclosure relates to an energy management system, and more particularly, to an energy management system capable of avoiding engineering overlap between a system visualization modeling tool and a graphic editor to enhance the efficiency of engineering, and a method thereof.

2. Description of the Related Art

The database of an energy management system may be divided into three types such as an off-line database, a real-time integrated database and a history database.

The off-line database may be used for the change operation (addition, deletion, change) of an electric power system model, and engineered using an off-line database editor and a system visualization modeling tool.

The engineered off-line database as described above may be uploaded to a real-time integrated database to be used for the real-time operation of an energy management system.

At this time, a screen for the real-time operation should be engineered using a graphic editor for the real-time operation.

The graphic editor as a tool for engineering the screen used for real-time operation may engineer (create) the screen using a real-time integrated database, and the resultant output may be used to monitor or control during the real-time operation.

At this time, an off-line database editor for engineering the off-line database and a graphic editor for engineering the real-time integrated database will be described below.

The off-line database editor as a tool for engineering an off-line database among the databases of the energy management system includes the data of monitoring facilities in a power system on the off-line database.

At this time, the off-line database editor may include a system visualization modeling tool to input a connection relationship between facilities, and the system visualization modeling tool provides an environment capable of configuring a connection relationship between facilities in a graphic format to reduce human error in the connection relationship between facilities when inputting data during the course of general text editing. Furthermore, when storing a connection relationship between facilities, the off-line database editor may examine if there is any unregistered facility or if there is any double-connected facility to reduce the engineer's error.

The graphic editor is a tool for engineering a monitoring screen during the real-time operation of an energy management system. There are various kinds of monitor screens, but the engineering of a system single line diagram screen among them is engineered by arranging objects, and configuring (in other words "setting") the characteristics of the objects using a real-time integrated database converted from an off-line database.

Furthermore, for the single line diagram screen, there exist a lot of screens for each region and capacity, and thus a lot of effort is required for engineering one by one, and there exists an overlapping region with engineering in the system visualization modeling tool.

In other words, in the related art, the operation of configuring an off-line database and the operation of configuring a real-time integrated database are separately carried out from each other.

At this time, though there exists an overlapping region between the operation of configuring an off-line database and the operation of configuring a real-time integrated database, the engineering is carried out without taking it into consideration, thereby causing a problem in which a lot of time and effort is consumed.

SUMMARY OF THE INVENTION

According to an embodiment, there is provided an energy management system capable of avoiding engineering overlap between a system visualization modeling tool and a graphic editor to enhance the efficiency of engineering, and a method thereof.

Technical problems to be solved in the proposed preferred embodiments of the invention are not restricted to the above-described problems and other technical problems which are not mentioned will definitely be understood by those skilled in the art from the following description.

A screen generation method of an energy management system according to an embodiment of the invention comprises performing system visualization modeling indicating a connection relationship between monitoring facilities in an electric power system to generate a first screen; generating a file containing information on a connection relationship between facilities used during the first screen generation; and generating a second screen for monitoring facilities during the real-time operation using the generated file.

Furthermore, said generating a first screen may include generating a screen for the operation of changing an electric power system model in an off-line database among the databases of the energy management system.

Furthermore, said generating a first screen comprises providing an interface capable of configuring a connection relationship between facilities in a graphic format, configuring a connection relationship between the facilities on the provided interface, and storing data corresponding to the connection relationship between the configured facilities.

Furthermore, the method may further comprise performing an error check for a connection relationship configuring between the facilities prior to storing the data, wherein said performing an error check comprises checking if there exists any unregistered facility on the first screen, and checking if there exists any double-connected facility on the first screen.

Furthermore, said generating a file may comprise generating information indicating a connection relationship between the facilities into a file in the form of Extensible Markup Language (abbreviated as XML hereinafter).

Furthermore, the generated file may comprise at least one additional information for reflecting (in other words including) information contained in the file on the second screen.

Furthermore, the additional information may comprise at least one of screen information containing the screen size information and background color information on the generated first screen, object information containing the kind, location, size and facility point on facilities contained in the generated first screen, and connection information containing connection location information between each object contained in the object information.

Furthermore, said generating the second screen comprises reconfiguring information contained in the generated file using a prestored conversion table.

Furthermore, said reconfiguring step may comprise reconfiguring information contained in the generated file into an object and symbol used on the second screen using the conversion table.

Furthermore, said generating the second screen may comprise generating a second screen for real-time operation monitoring and control in a real-time integrated database among the databases of the energy management system.

On the other hand, an energy management system according to the present disclosure may comprise an off-line database configured to provide a user interface for the operation of changing an electric power system model; and a real-time integrated database configured to receive and process system data transmitted from the off-line database, and accordingly monitor the electric power system (abbreviated as power system hereinafter) in real time, wherein the off-line database performs system visualization modeling indicating a connection relationship between monitoring facilities in the power system using a first editor to generate a first screen, and generates a file containing information on a connection relationship between facilities used during the generation of the first screen, and the real-time integrated database generates a second screen for monitoring facilities during the real-time operation on the basis of a file generated from the first editor using a second editor.

Furthermore, the off-line database generates information indicating a connection relationship between the facilities as a file in the form of XML, and the real-time integrated database reads the file in the form of XML generated from the off-line database to generate a single line diagram screen for the real-time monitoring.

Furthermore, the generated file may comprise at least one additional information for reflecting information contained in the file on the second screen, and the additional information may comprises at least one of screen information containing the screen size information and background color information on the generated first screen, object information containing the kind, location, size and facility point on facilities contained in the generated first screen, and connection information containing connection location information between each object contained in the object information.

Furthermore, the real-time integrated database reconfigures information contained in the generated file as an object and symbol used on the second screen using a previously stored conversion table to generate the second screen.

Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present invention is to be defined only by the scope of the appended claims. Further, like reference numerals refer to like or similar elements throughout the specification.

In describing the embodiments of the present disclosure, the detailed description will be omitted when a specific description for publicly known functions or configurations to which the invention pertains is judged to obscure the gist of the present invention. The terms below may be changed depending on a user or operator's intentions or practices, or the like, as terms defined in consideration of functions according to an embodiment of the present disclosure. Accordingly, the definitions should be construed on the basis of the overall description of the specification.

It should be noted that the combinations of respective blocks of accompanying drawings and respective steps of flow charts may be performed by computer program instructions. The computer program instructions may be mounted on a general-purpose computer, a special-purpose computer or a processor in other programmable data processing equipment, and thus the instructions performed through the computer, or processor in other programmable data processing equipment generate a means for performing the foregoing functions in respective blocks of the block diagrams or in respective steps of the flow charts. The computer program instructions can be also stored in a computer usable or computer readable memory capable of directing the computer or other programmable data processing equipment to implement functions in a specific manner, and thus the instructions stored in the computer usable or computer readable memory may also produce manufacturing items including an instruction means for performing the functions described in respective blocks of the block diagrams or respective steps of the flow charts. Additionally, the computer program instructions may be also be mounted on a computer or other programmable data processing equipment, and thus instructions for performing a series of operational steps on the computer or other programmable data processing equipment and generating a computer executable process to perform the computer or other programmable data processing equipment, may also provide steps for executing functions described in respective blocks of the block diagrams and respective steps of the flow charts.

Furthermore, each block or each step may indicate part of a module, a segment or a code including one or more executable instructions for performing a specific logical function (or functions). Moreover, it should be noted that, in some modified embodiments of the present invention, the functions described in the blocks or the steps may be generated out of the order. For instance, sequentially illustrated two blocks or steps can be actually performed at the same time, or sometimes can be performed in a reverse order according to the corresponding functions.

In an energy management system according to the present disclosure, engineering for defining a connection relationship between facilities in a database is carried out through system visualization modeling, and a single line diagram screen for monitoring a power system during the system operation is generated using a graphic editor.

At this time, the system visualization modeling and graphic editor are individually engineered, and thus has a disadvantage in which a portion of engineering is overlapped during the system visualization modeling and single line diagram screen generation.

Accordingly, in this embodiment, there is proposed an effective scheme for generating a single line diagram screen through a system visualization modeling conversion to reduce such an engineering effort.

FIG. 1 is a view schematically illustrating an energy management system according to an embodiment of the present disclosure.

Referring to FIG. 1, the energy management system may comprise an off-line database 100, a real-time integrated database 200, and a history database 300.

The off-line database 100 provides an optimized environment and a user interface for the operation of changing a power system model (for example, addition, deletion, change or the like of a power system model).

To this end, the off-line database 100 uses a Relational Data Base Management System (abbreviated as RDBMS), and employs a Common Information Model (abbreviated as CIM) for system model compatibility.

Data inputted to the off-line database 100 by a database operator through a separate editor is extracted in a file format and transmitted to the real-time integrated database 200.

The editor (specifically, off-line database editor) as a tool for engineering the off-line database 100 among the databases of an energy management system reflects (in other words inputs) the data of monitoring facilities in a power system on the off-line database 100.

At this time, the editor may comprise a system visualization modeling tool to enter a connection relationship between facilities. The system visualization modeling tool provides an environment capable of configuring a connection relationship between facilities in a graphic format to reduce human error in the connection relationship between facilities when entering data during the course of general text editing, and has a symbol editing function for distinguishing it from the other facility.

Furthermore, when storing data, the editor examines if there is any unregistered facility, and accordingly, examines if there is any disconnected facility or if there is any double-connected facility on the graphic screen, thereby reducing the engineer's error.

At this time, diagram data generated through the editor may be stored in the off-line database 100 as well as stored in a separate backup storage, thereby allowing engineering even in an emergency in which it cannot be connected to the off-line database 100.

System data transmitted from the off-line database 100 is uploaded to the real-time integrated database 200. The process of uploading system data to a real-time integrated database as described above may be referred to as a population process.

When the real-time integrated database 200 is in an on-line state through the population process, all the functions of the host are carried out in real time based on this.

In other words, the real-time integrated database 200 acquires and processes a large amount of data in real time from a Supervisory Control and Data Acquisition (typically, abbreviated as "SCADA") system as well as perform various application programs such as economic electric power supplying, automatic electric power generation control, redundant electric power/auxiliary electric power service, demand forecasting, status estimation, electric power flow calculation, and the like.

Since real-time performances are so important above all in such an on-line environment, in case of the real-time integrated database 200, a main memory-based large capacity database management technology is used instead of a relational data base management system.

Furthermore, the real-time integrated database 200 has an integrated database format in which different applications approach it through a common application interface (abbreviated as API) provided by a relational data base management system but is logically designed in a format that there coexist a Real Time Database (abbreviated as RTDB) configured with a table for processing a SCADA and Graphic User Interface (abbreviated as GUI) in real time and an Application Common Model (abbreviated as ACM hereinafter) for application use such as electric power generation control, system analysis, and the like.

In particular, in case of ACM, it is a core in the design of an energy management system for real-time processing, and has the following features.

The ACM stores data shared by one or more applications, and configures a static table and a dynamic table in parallel, and excludes the general index table structure of a relational database, and uses entry index, entry ID (abbreviation of Identifier), and forward point, and applies the same input/output structure for compatibility between system analysis applications as well as introduces a branch table and an injection table, thereby enhancing the code efficiency and performance.

Here, the static table is data inputted in an off-line mode and uploaded during the initialization of a real-time integrated database, and the dynamic table is data updated whenever performing an application subsequent to loading the real-time integrated database. Furthermore, the parallel configuration with a parallel table configuration allows data retrieval at a time with the same entry index, and the branch table may comprise a power line, a transformer, ZBR, and the like, and the injection table may include an electric power generator, a phase modifier, an electric load, and the like.

Finally, the history database 300 is designed for the long-term storage of data processed by an energy management system, and configured on the basis of commercial RDBMS on a separate server to periodically store the data of the real-time integrated database 200.

The main function of the history database 300 may include periodic data collection from the host, backup, inquiry, modification, and other functions.

Hereinafter, a system visualization modeling process and a screen generation process will be described. The system visualization modeling process is carried out by the off-line database 100, and the single line diagram screen generation is carried out by the real-time integrated database 200.

FIG. 2 is a view for explaining an apparatus for engineering in a database according to an embodiment of the present disclosure.

Referring to FIG. 2, the foregoing engineering is carried out by an off-line database editor 110 including a system visualization modeling tool 102 on the off-line database 100, and carried out by a graphic editor 210 on the real-time integrated database 200.

The off-line database editor 110 as a tool for engineering the off-line database 100 among the databases of the energy management system reflects the data of monitoring facilities in the power system on the off-line database 100.

The off-line database editor 110 may include a system visualization modeling tool 102 to enter a connection relationship between facilities. The system visualization modeling tool 102 provides an environment capable of configuring a connection relationship between facilities in a graphic format to reduce human error in the connection relationship between facilities when entering data during the course of general text editing, and has a symbol editing function for distinguishing it from the other facility. Furthermore, when storing data, the system visualization modeling tool 102 examines if there is any unregistered facility, and examines if there is any disconnected facility or if there is any double-connected facility on the graphic screen, thereby reducing the engineer's error.

Diagram data generated through the foregoing off-line database editor 110 may be stored in the off-line database 100 as well as in a backup file, thereby allowing engineering even in a situation in which it cannot be connected to the off-line database 100.

The graphic editor 210 is an engineering tool for connecting an object to the screen and storing the object in a monitoring file during the on-line operation using the real-time integrated database 200. Furthermore, the graphic editor 210 is a tool for creating all screens used in an on-line state in an energy management system as well as a monitoring single line diagram screen in the energy management system.

At this time, in order to engineer a single line diagram screen in the system, an object or objects provided from the graphic editor 210 are grouped, added and arranged on the screen using symbols used like libraries, and the attributes should be set.

Furthermore, characteristics allowing the relevant object to be dynamically operated according to a value of the real-time integrated database during the on-line operation are defined, thereby generating a single line diagram.

Since there exist single line diagram screens for each region and capacity in an energy management system, a lot of effort is required to generate all single line diagrams one by one. In particular, connection information between facilities engineered during the system visualization modeling should be engineered even on the single line diagram screen, and thus overlapping efforts are required.

Furthermore, even if a physical change occurs such as facility replacement, the off-line database 100 should be changed through the off-line database editor 110, and screen engineering is necessary again to reflect the changed database and a connection relationship between facilities on the single line diagram screen.

Accordingly, during the system visualization modeling according to the present disclosure, connection relationship information between each facility (object), object information and screen information are generated and stored as separate files.

Furthermore, the generated file is provided to the graphic editor 210, and the graphic editor 210 generates a single line diagram screen using the provided file.

FIG. 3 is a view illustrating a file being stored according to an embodiment of the present disclosure.

In other words, as illustrated in FIG. 3, the off-line database editor 110 stores information on a screen generated during the system visualization modeling process, object information and connection relationship information on the each object. In other words, when the connection relationship is stored as an additional XML file, the graphic editor 210 may reads the XML file to automatically generate part of the single line diagram screen, thereby avoiding the engineering overlapping.

The XML file guarantees compatibility in heterogeneous systems, and thus may be used to exchange data in different tools.

Accordingly, when storing a connection relationship between facilities engineered thought eh system visualization modeling, the connection relationship between facilities is stored as a file in the form of XML as well as the off-line database 100.

At this time, when storing the connection relationship, the off-line database editor 110 considers and stores the following items.

A first item is screen information. In other words, a screen generated by visualization modeling in the off-line database editor 110 should be reflected on a single line diagram screen in the graphic editor 210, and thus screen information such as the size or background color of the screen should be stored.

A second item is facility (object) information. In other words, in order to generate the single line diagram screen, the kind, location on the screen, size, color, and connected facility point information and the like of respective facilities are required, and accordingly, when storing the connection relationship, the foregoing facility information is also stored at the same time.

Finally, connection information between facilities should be taken into consideration.

As described above, screen information, facility information and connection information between facilities are stored in the form of an XML file, and thus used to automatically generate an object on the single line diagram screen in the graphic editor 210.

In other words, the off-line database editor 110 generates the XML file in consideration of items disclosed in Table 1.

TABLE 1

| Object to be considered | Detailed information |
|---|---|
| Screen information | Screen size |
|  | Background color |
| Object information | Facility kind (CB, DS, TR, etc.) |
|  | Location on the screen |
|  | Object size |
|  | Facility point |
| Connection relationship information | Connecting position between objects |

In the Table 1, CB represents a circuit breaker, DS represents a disconnecting switch and TR represents a transformer.

On the other hand, the graphic editor 210 reads an XML file stored during the visualization modeling and reconfigures the XML file with its own used objects and symbols to generate a single line diagram screen.

FIG. 4 is a view illustrating a conversion table of a graphic editor according to an embodiment of the present disclosure.

Referring to FIG. 4, when generating a screen, the graphic editor 210 determines the facility kind according to the foregoing conversion table to generate the objects and symbols of the graphic editor, and accordingly connects a facility point to the relevant object.

At this time, an engineer configures only characteristics that should be operated during the real-time operation on an automatically generated screen, thereby completing the creation of a single line diagram screen.

FIG. 5 is a flow chart for explaining a screen generation method of an energy management system for each step according to an embodiment of the present disclosure.

Referring to FIG. 5, as described above, the off-line database editor 110 performs visualization modeling for reflecting the data of monitoring facilities in a power system on an off-line database (Step 101).

At this time, the off-line database editor 110 stores screen information, object information and connection information on visualization modeling during the visualization modeling process in the form of an XML file (Step 102).

Then, the graphic editor 210 receives the XML file to automatically generate an object of the single line diagram screen using a graphic editor conversion table (Step 103).

As described above, engineering for generating a system single line diagram screen in an energy management system requires a lot of time and involves human error. In particular, a system visualization model engineering and a single line diagram screen generation engineering causes a problem in which time and effort are overlapped with each other.

However, according to the present disclosure, the system visualization model engineering may be used during the single line diagram screen generation engineering to drastically reduce an engineering time for single line diagram screen generation, thereby alleviating an engineer's effort and reducing an error.

Up to now, the present disclosure has been described around preferred embodiments thereof, but it is merely illustrative but not restrictive in all aspects. It will be apparent to those skilled in this art that various modifications and applications which are not illustrated in the above may be made thereto without departing from the gist of the present invention. For example, each constituent element illustrated in detail in an embodiment of the present disclosure may be implemented in various modifications. Furthermore, all differences associated with the modifications and applications should be construed to be included in the scope of the present disclosure as defined in the accompanying claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
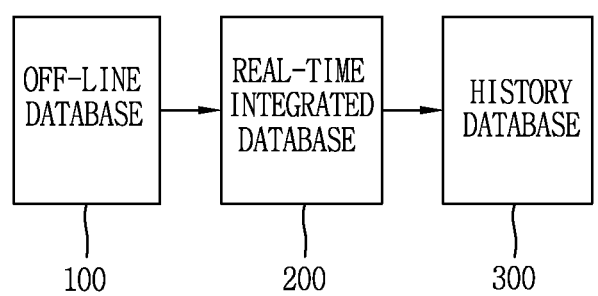
FIG. 1 is a view schematically illustrating an energy management system according to an embodiment of the present disclosure.

Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present invention is to be defined only by the scope of the appended claims. Further, like reference numerals refer to like or similar elements throughout the specification.

In describing the embodiments of the present disclosure, the detailed description will be omitted when a specific description for publicly known functions or configurations to which the invention pertains is judged to obscure the gist of the present invention. The terms below may be changed depending on a user or operator's intentions or practices, or the like, as terms defined in consideration of functions according to an embodiment of the present disclosure. Accordingly, the definitions should be construed on the basis of the overall description of the specification.

It should be noted that the combinations of respective blocks of accompanying drawings and respective steps of flow charts may be performed by computer program instructions. The computer program instructions may be mounted on a general-purpose computer, a special-purpose computer or a processor in other programmable data processing equipment, and thus the instructions performed through the computer, or processor in other programmable data processing equipment generate a means for performing the foregoing functions in respective blocks of the block diagrams or in respective steps of the flow charts. The computer program instructions can be also stored in a computer usable or computer readable memory capable of directing the computer or other programmable data processing equipment to implement functions in a specific manner, and thus the instructions stored in the computer usable or computer readable memory may also produce manufacturing items including an instruction means for performing the functions described in respective blocks of the block diagrams or respective steps of the flow charts. Additionally, the computer program instructions may be also be mounted on a computer or other programmable data processing equipment, and thus instructions for performing a series of operational steps on the computer or other programmable data processing equipment and generating a computer executable process to perform the computer or other programmable data processing equipment, may also provide steps for executing functions described in respective blocks of the block diagrams and respective steps of the flow charts.

Furthermore, each block or each step may indicate part of a module, a segment or a code including one or more executable instructions for performing a specific logical function (or functions). Moreover, it should be noted that, in some modified embodiments of the present invention, the functions described in the blocks or the steps may be generated out of the order. For instance, sequentially illustrated two blocks or steps can be actually performed at the same time, or sometimes can be performed in a reverse order according to the corresponding functions.

In an energy management system, engineering for defining a connection relationship between facilities in a database is carried out through system visualization modeling, and a single line diagram screen for monitoring a power system during the system operation is generated using a graphic editor.

At this time, the system visualization modeling and graphic editor are individually engineered, and thus has a disadvantage in which a portion of engineering is overlapped during the system visualization modeling and single line diagram screen generation.

Accordingly, in this embodiment, there is proposed an effective scheme for generating a single line diagram screen through a system visualization modeling conversion to reduce such an engineering effort.

FIG. 1 is a view schematically illustrating an energy management system according to an embodiment of the present disclosure.

Referring to FIG. 1, the energy management system may include an off-line database 100, a real-time integrated database 200, and a history database 300.

The off-line database 100 provides an optimized environment and a user interface for the operation of changing a power system model (for example, addition, deletion, change or the like of a power system model).

To this end, the off-line database 100 uses a relational data base management system (abbreviated as RDBMS), and employs a common information model (abbreviated as CIM) for system model compatibility.

Data entered to the off-line database 100 by a database operator through a separate editor is extracted in a file format and transmitted to the real-time integrated database 200.

The editor (specifically, off-line database editor) as a tool for engineering the off-line database 100 among the databases of an energy management system reflects the data of monitoring facilities in a power system on the off-line database 100.

At this time, the editor may include a system visualization modeling tool to enter a connection relationship between facilities. The system visualization modeling tool provides an environment capable of configuring a connection relationship between facilities in a graphic format to reduce human error in the connection relationship between facilities when entering data during the course of general text editing, and has a symbol editing function for distinguishing it from the other facility.

Furthermore, when storing data, the editor examines if there is any unregistered facility, and accordingly, examines if there is any disconnected facility or if there is any double-connected facility on the graphic screen, thereby reducing the engineer's error.

At this time, diagram data generated through the editor may be stored in the off-line database 100 as well as stored in a separate backup storage, thereby allowing engineering even in an emergency in which it cannot be connected to the off-line database 100.

System data transmitted from the off-line database 100 is uploaded to the real-time integrated database 200. The process of uploading system data to a real-time integrated database as described above may be referred to as a population process.

When the real-time integrated database 200 is in an on-line state through the population process, all the functions of the host are carried out in real time based on this.

In other words, the real-time integrated database 200 acquires and processes a large amount of data in real time from a supervisory control and data acquisition (abbreviated as SCADA) system as well as perform various application programs such as economic power supplying, automatic power generation control, redundant power/auxiliary power service, demand forecasting, status estimation, electric power flow calculation, and the like.

Since real-time performances are so important above all in such an on-line environment, in case of the real-time integrated database 200, a main memory-based large capacity database management technology is used instead of a relational data base management system.

Furthermore, the real-time integrated database 200 has an integrated database format in which different applications approach it through a common application interface (abbreviated as API) provided by a relational data base management system but is logically designed in a format that there coexist a real time database (abbreviated as RTDB) configured with a table for processing a SCADA and graphic user interface (abbreviated as GUI) in real time and an application common model (abbreviated as ACM) for application use such as generation control, system analysis, and the like.

In particular, in case of ACM, it is a core in the design of a energy management system for real-time processing, and has the following features.

The ACM stores data shared by one or more applications, and configures a static table and a dynamic table in parallel, and excludes the general index table structure of a relational database, and uses entry index, entry ID, and forward point, and applies the same input/output structure for compatibility between system analysis applications as well as introduces a branch table and an injection table, thereby enhancing the code efficiency and performance.

Here, the static table is data entered in an off-line mode and uploaded during the initialization of a real-time integrated database, and the dynamic table is data updated whenever performing an application subsequent to loading the real-time integrated database. Furthermore, the parallel configuration with a parallel table configuration allows data retrieval at a time with the same entry index, and the branch table may include a line, a transformer and the like, and the injection table may include a generator, a phase modifier, a load, and the like.

Finally, the history database 300 is designed for the long-term storage of data processed by the energy management system, and configured on the basis of commercial RDBMS on a separate server to periodically store the data of the real-time integrated database 200.

The main function of the history database 300 may include periodic data collection from the host, backup, inquiry, modification, and other functions.

Hereinafter, a system visualization modeling process and a screen generation process will be described. The system visualization modeling process is carried out by the off-line database 100, and the single line diagram screen generation is carried out by the real-time integrated database 200.

Figure 2:
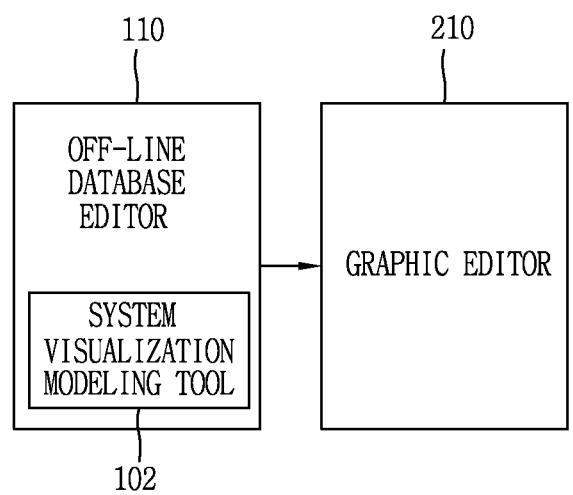
FIG. 2 is a view for explaining an apparatus for engineering in a database according to an embodiment of the present disclosure.

FIG. 2 is a view for explaining an apparatus for engineering in a database according to an embodiment of the present disclosure.

Referring to FIG. 2, the foregoing engineering is carried out by an off-line database editor 110 including a system visualization modeling tool 102 on the off-line database 100, and carried out by a graphic editor 210 on the real-time integrated database 200.

The off-line database editor 110 as a tool for engineering the off-line database 100 among the databases of the energy management system reflects the data of monitoring facilities in a power system on the off-line database 100.

The off-line database editor 110 may include a system visualization modeling tool 102 to enter a connection relationship between facilities. The system visualization modeling tool 102 provides an environment capable of configuring a connection relationship between facilities in a graphic format to reduce human error in the connection relationship between facilities when entering data during the course of general text editing, and has a symbol editing function for distinguishing it from the other facility. Furthermore, when storing data, the system visualization modeling tool 102 examines if there is any unregistered facility, and examines if there is any disconnected facility or if there is any double-connected facility on the graphic screen, thereby reducing the engineer's error.

Diagram data generated through the foregoing off-line database editor 110 may be stored in the off-line database 100 as well as in a backup file, thereby allowing engineering even in a situation in which it cannot be connected to the off-line database 100.

The graphic editor 210 is an engineering tool for connecting an object to the screen and storing the object in a monitoring file during the on-line operation using the real-time integrated database 200. Furthermore, the graphic editor 210 is a tool for creating all screens used in an on-line state in a energy management system as well as a monitoring single line diagram screen in the energy management system.

At this time, in order to engineer a single line diagram screen in the system, an object or objects provided from the graphic editor 210 are grouped, added and arranged on the screen using symbols used like libraries, and the attributes should be set.

Furthermore, characteristics allowing the relevant object to be dynamically operated according to a value of the real-time integrated database during the on-line operation are defined, thereby generating a single line diagram.

Since there exist single line diagram screens for each region and capacity in the energy management system, a lot of effort is required to generate all single line diagrams one by one. In particular, connection information between facilities engineered during the system visualization modeling should be engineered even on the single line diagram screen, and thus overlapping efforts are required.

Furthermore, even if a physical change occurs such as facility replacement, the off-line database 100 should be changed through the off-line database editor 110, and screen engineering is necessary again to reflect the changed database and a connection relationship between facilities on the single line diagram screen.

Accordingly, during the system visualization modeling according to the present disclosure, connection relationship information between each facility (object), object information and screen information are generated and stored as separate files.

Furthermore, the generated file is provided to the graphic editor 210, and the graphic editor 210 generates a single line diagram screen using the provided file.

Figures 3, 4:
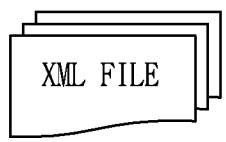
FIG. 3 is a view illustrating a file being stored according to an embodiment of the present disclosure.
FIG. 4 is a view illustrating a conversion table of a graphic editor according to an embodiment of the present disclosure.

FIG. 3 is a view illustrating a file being stored according to an embodiment of the present disclosure.

In other words, as illustrated in FIG. 3, the off-line database editor 110 stores information on a screen generated during the system visualization modeling process, object information and connection relationship information on the each object. In other words, when the connection relationship is stored as an additional XML file, the graphic editor 210 may reads the XML file to automatically generate part of the single line diagram screen, thereby avoiding the engineering overlapping.

The XML file guarantees compatibility in heterogeneous systems, and thus may be used to exchange data in different tools.

Accordingly, when storing a connection relationship between facilities engineered thought eh system visualization modeling, the connection relationship between facilities is stored as a file in the form of XML as well as the off-line database 100.

At this time, when storing the connection relationship, the off-line database editor 110 considers and stores the following items.

A first item is screen information. In other words, a screen generated by visualization modeling in the off-line database editor 110 should be reflected on a single line diagram screen in the graphic editor 210, and thus screen information such as the size or background color of the screen should be stored.

A second item is facility (object) information. In other words, in order to generate the single line diagram screen, the kind, location on the screen, size, color, and connected facility point information and the like of respective facilities are required, and accordingly, when storing the connection relationship, the foregoing facility information is also stored at the same time.

Finally, connection information between facilities should be taken into consideration.

As described above, screen information, facility information and connection information between facilities are stored in the form of an XML file, and thus used to automatically generate an object on the single line diagram screen in the graphic editor 210.

In other words, the off-line database editor 110 generates the XML file in consideration of items disclosed in Table 1.

TABLE 1

| Object to be considered | Detailed information |
|---|---|
| Screen information | Screen size |
| | Background color |
| Object information | Facility kind (CB, DS, TR, etc.) |
| | Location on the screen |
| | Object size |
| | Facility point |
| Connection relationship information | Connecting position between objects |

In the Table 1, CB represents a circuit breaker, DS represents a disconnecting switch and TR represents a transformer.

On the other hand, the graphic editor 210 reads an XML file stored during the visualization modeling and reconfigures the XML file with its own used objects and symbols to generate a single line diagram screen.

FIG. 4 is a view illustrating a conversion table of a graphic editor according to an embodiment of the present disclosure.

Referring to FIG. 4, when generating a screen, the graphic editor 210 determines the facility type according to the foregoing conversion table to generate the objects and symbols of the graphic editor, and accordingly connects a facility point to the relevant object.

At this time, an engineer configures only characteristics that should be operated during the real-time operation on an automatically generated screen, thereby completing the creation of a single line diagram screen.

Figure 5:
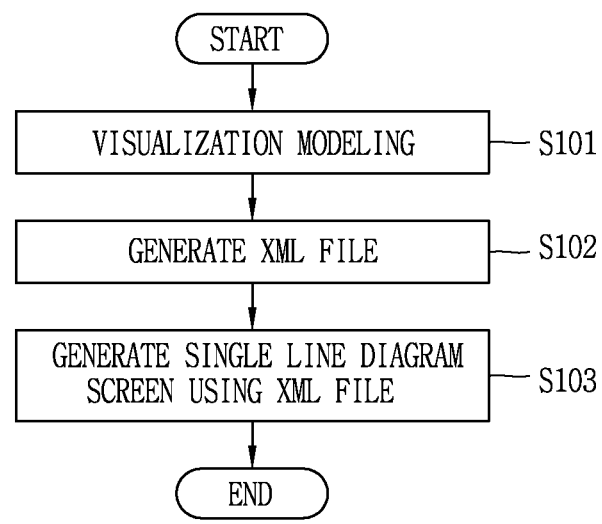
FIG. 5 is a flow chart for explaining a screen generation method of an energy management system for each step according to an embodiment of the present disclosure.

FIG. 5 is a flow chart for explaining a screen generation method of an energy management system for each step according to an embodiment of the present disclosure.

Referring to FIG. 5, as described above, the off-line database editor 110 performs visualization modeling for reflecting the data of monitoring facilities in a power system on an off-line database (Step 101).

At this time, the off-line database editor 110 stores screen information, object information and connection information on visualization modeling during the visualization modeling process in the form of an XML file (Step 102).

Then, the graphic editor 210 receives the XML file to automatically generate an object of the single line diagram screen using a graphic editor conversion table (Step 103).

As described above, engineering for generating a system single line diagram screen in an energy management system requires a lot of time and involves human error. In particular, a system visualization model engineering and a single line diagram screen generation engineering causes a problem in which time and effort are overlapped with each other.

However, according to the present disclosure, the system visualization model engineering may be used during the single line diagram screen generation engineering to drastically reduce an engineering time for single line diagram screen generation, thereby alleviating an engineer's effort and reducing an error.

Up to now, the present disclosure has been described around preferred embodiments thereof, but it is merely illustrative but not restrictive in all aspects. It will be apparent to those skilled in this art that various modifications and applications which are not illustrated in the above may be made thereto without departing from the gist of the present invention. For example, each constituent element illustrated in detail in an embodiment of the present disclosure may be implemented in various modifications. Furthermore, all differences associated with the modifications and applications should be construed to be included in the scope of the present disclosure as defined in the accompanying claims.

What is claimed is:

1. A system visualization modeling method for an energy management system, the method comprising:
   displaying on a display of the energy management system a first screen comprising a schematic diagram including a plurality of objects corresponding to facilities to be monitored in an electric power system;
   arranging one or more connections between the plurality of objects corresponding to connections between the facilities to be monitored;
   generating a file comprising information on the arranged connections between the facilities and information of the first screen;
   storing the generated file in a memory of the energy management system; and
   displaying on the display a second screen for monitoring the facilities during a real-time operation of the energy management system according to the generated file stored in the memory, wherein the second screen comprises the information of the first screen and the schematic diagram indicating the connection between facilities;
   wherein the generated file further comprises:
   screen information comprising screen size and background color information of the first screen;
   object information related to a kind, location, size, and facility type of one or more facilities contained in the generated first screen; and
   connection information related to connection location information between each object of the object information.

2. The method of claim 1, wherein the first screen comprises:
   an interface for changing the schematic diagram of the electric power system in an off-line database.

3. The method of claim 1, wherein the first screen comprises:
   an interface for configuring the one or more connections between facilities in a graphic format;
   configuring the one or more connections between the facilities on the provided interface; and
   storing data corresponding to the one or more connections.

4. The method of claim 3, further comprising:
   performing an error check for the one or more connections between the facilities prior to storing the data; wherein the error check comprises:
   checking if there are any unregistered facilities on the first screen; and
   checking if there are any double-connected facilities on the first screen.

5. The method of claim 1, wherein the generated the corresponds to an XML format file.

6. The method of claim 1, wherein the second screen comprises:
   reconfiguring information of the generated file using a prestored conversion table.

7. The method of claim 6, wherein the reconfiguring information comprises:
   information indicating an object and symbol used on the second screen corresponding to the information of the generated the using the conversion table.

8. The method of claim 1, wherein the second screen comprises:
   an interface for real-time operation monitoring and controlling an integrated database of the energy management system.

* * * * *